United States Patent
Agarkov et al.

(10) Patent No.: US 10,061,536 B2
(45) Date of Patent: Aug. 28, 2018

(54) DISK SYNCHRONIZATION

(71) Applicant: EMC IP Holding Company LLC, Hopkinton, MA (US)

(72) Inventors: Vadim Agarkov, Saint Petersburg (RU); Sergey Storozhevykh, Saint Petersburg (RU); Maksim Vazhenin, Saint Petersburg (RU); Ilya Volzhev, Saint Petersburg (RU); Michael E. Bappe, Loveland, CO (US)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 15/086,349

(22) Filed: Mar. 31, 2016

(65) Prior Publication Data

US 2017/0090769 A1 Mar. 30, 2017

(30) Foreign Application Priority Data

Sep. 28, 2015 (RU) .................. 2015141116

(51) Int. Cl.
*G06F 11/00* (2006.01)
*G06F 3/06* (2006.01)
*G06F 11/07* (2006.01)

(52) U.S. Cl.
CPC .............. *G06F 3/065* (2013.01); *G06F 3/061* (2013.01); *G06F 3/067* (2013.01); *G06F 3/0659* (2013.01); *G06F 11/079* (2013.01); *G06F 11/0727* (2013.01); *G06F 11/0751* (2013.01); *G06F 11/0793* (2013.01)

(58) Field of Classification Search
CPC ............. G06F 11/0793; G06F 11/0751; G06F 11/0727; G06F 11/079; G06F 11/2071; G06F 11/1464; G06F 11/1461; G06F 11/2082; G06F 11/2087
See application file for complete search history.

(56) References Cited

U.S. PATENT DOCUMENTS

| | | | |
|---|---|---|---|
| 7,076,510 B2* | 7/2006 | Brown | G06F 11/1076 |
| 7,293,154 B1* | 11/2007 | Karr | G06F 11/2082 |
| | | | 711/202 |
| 9,727,576 B2* | 8/2017 | Zhao | G06F 17/30174 |
| 2010/0161853 A1* | 6/2010 | Curran | G06F 13/385 |
| | | | 710/39 |
| 2013/0110974 A1* | 5/2013 | Arrasvuori | H04L 67/18 |
| | | | 709/217 |
| 2016/0203055 A1* | 7/2016 | Dain | G06F 11/1453 |
| | | | 714/6.24 |

\* cited by examiner

*Primary Examiner* — Nadeem Iqbal
(74) *Attorney, Agent, or Firm* — Daly, Crowley, Mofford & Durkee, LLP (57) ABSTRACT

Embodiments of the present disclosure relate to a system, a computer program product and a method for synchronizing data between a source disk and a target disk in a cluster by performing synchronization between a source disk and a target disk, the synchronization being performed while a plurality of application I/Os on a plurality of nodes in a cluster are configured to access the source disk; and wherein a coordinator and a plurality of workers in the cluster are configured to manage copying data from the source disk to the target disk.

15 Claims, 8 Drawing Sheets

DISK SYNCHRONIZATION

RELATED PATENT APPLICATIONS

This patent application claims priority to Russian Patent Application Number 2015141116, filed Sep. 28, 2015, and entitled "DISK SYNCHRONIZATION," which is incorporated herein by reference in its entirety.

DISCLAIMER

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to disk synchronization.

BACKGROUND

Computer systems are constantly improving in terms of speed, reliability, and processing capability. Generally, computer systems that process and store large amounts of data include one or more processors that are in communication with a shared data storage system, in which the data is stored. Data storage system may include one or more storage devices, usually of a fairly robust nature and useful for storage, and typically include an array of a plurality of disks with on-board intelligence and communications electronics and software for making the data on the disks available.

Disks migration typically enables non-disruptive or minimally disruptive data migration between data storage systems. Typically in the process of migration, a major portion of the overall time for migration is consumed by synchronization of a source disk and a target disk. For any solution that provides the functionality for migrating data it is important to minimize the overall time needed to synchronize the disks that are being migrated.

SUMMARY

Embodiments of the present disclosure relate to a system, computer program product and a method for synchronizing data between a source disk and a target disk in a cluster, by performing synchronization between a source disk and a target disk, the synchronization being performed while a plurality of application I/Os on a plurality of nodes in a cluster are configured to access the source disk; and wherein a coordinator and a plurality of workers in the cluster are configured to manage copying of data from the source disk to the target disk.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts.

Thus, features and advantages of the present disclosure will become more apparent from the following detailed description of exemplary embodiments thereof taken in conjunction with the accompanying drawings in which.

In the disclosure, like reference symbols in the various drawings may indicate like elements.

DETAILED DESCRIPTION

Usually, active-active clusters may enable multiple nodes in a high availability cluster to simultaneously have read-write access to the same logican unit number (disk). Generally, high availability clusters may provide continued service for users. Typically, most products that may provide functionality to non-diruptively migrate a first disk (source disk) to a second disk (target disk) may solve a problem of synchronizing the disks. Generally, synchronization of a disk may usually involve donning a new I/O (write, copy, move or other like command/applications) to both source disk and target disk while copying a disk block by block (copy sweep, simply referred to as copy). Typically, in such cases problems associated with synchronization may become more difficult to solve in an active-active cluster environment, especially when several hosts may access a source disk, because a node which performs copy may need to handle conflicts between I/O from other nodes in a cluster to the disk with the currently running copy, which may guarantee that a disk may be synchronized correctly.

Embodiments of the disclosure provides an algorithm for synchronization of source disks and target disks in active-active cluster environment, which may implement a copy (copy sweep) on a coordinator, which may be located on one node, while other nodes in the cluster may suspend I/Os. In one embodiment, suspending may generally mean interrupting or halting or postponing or halting or deferring or rescheduling or adjourning an I/O operation. In certain embodiments, an algorithm may minimize a time for which I/O may be suspended on nodes during each copy sweep, which in turn may minimize effects of migration process on application I/O.

In an embodiment, as used herein, the term disks may be a storage medium and may refer to one or more storage mediums such as a hard drive, a combination of hard drives, flash storage, combinations of flash storage, combinations of hard drives, flash, and other storage devices, and other types and combinations of computer readable storage mediums including those yet to be conceived. In some embodiments, a storage medium may also refer both physical and logical storage mediums and may include multiple level of virtual to physical mappings and may be or include an image or disk image.

Embodiments of the present disclosure may be related to a method for synchronizing data between a source disk and a target disk in a cluster by performing synchronization between a source disk and a target disk, the synchronization may be performed while a plurality of application I/Os operating/executing on a plurality of nodes in a cluster may be accessing a source disk. In a further embodiment a coordinator and a plurality of workers in a cluster may be configured to manage copying data from a source disk to a target disk. In one embodiment I/Os may refer generally to operation such as read, write, copy, move or other similar operations. In one embodiment, advantageously within the present disclosure I/Os may have the general meaning of write, but may not be limiting to a write only.

A further embodiment may include managing synchronization of a subsequent unsynchronized portion of a source disk and a target disk. In a further embodiment, a coordinator may be configured to define a selected range [S,E] that may be copied from a source disk to a target disk, wherein S may be associated with a start value of the range to be copied and E may be associated with an end value of the range to be copied. In a further embodiment, a coordinator may be configured to send a suspend status notification (for example "SUSPEND_IO [S,E]" or "IO_SUSPEND[S,E]" or "SUSPEND") of a selected range [S,E] (chosen range) that may be copied from a source disk to a target disk to a plurality of workers in a cluster.

In a further embodiment, a worker on receiving a suspend status notification from a coordinator may be configured to determine if an (any) outstanding fully overlapping application write I/Os may be present or existing or pending. In yet a further embodiment, a worker may be configured to check for a presence of an outstanding fully overlapping application write I/O. In yet a further embodiment, a worker on positive determination of an outstanding fully overlapping application write I/O, may be configured to wait until an overlapping application write I/O may be completed. In yet a further embodiment, a worker may be configured to clone (copy) an application write I/O to a target disk. In yet a further embodiment, a worker may be configured to send a copied status notification (for example "RANGE_COPIED" or "COPY" or "COPIED_RANGE" or "COPIED") specifying a range [S1,E1], wherein S1 may be associated with a start value of the range and E1 may be associated with an end value of the range corresponding to an overlapping application write I/O.

In one embodiment, a worker may be configured to check for an outstanding overlapping write I/O. In a further embodiment, on negative determination for a check of an outstanding overlapping write I/O, a worker may be configured to suspend a conflicting application write I/O clone to a target disk. In yet a further embodiment, a worker may be configured to wait for an outstanding conflicting application write I/O clone on a target disk to drain.

In one embodiment, during a wait for an outstanding conflicting application write I/O clone on a target disk to drain, a new fully overlapping application write I/O may be received. In a further embodiment, when a new fully overlapping application write I/O may be received, a worker may be configured to resume an application write I/O clone to a target disk. In a further embodiment, a worker may be configured to issue an application write I/O to a source disk. In a yet further embodiment, a worker may be configured to clone (copy) an application write I/O to a target disk. In yet a further embodiment a worker may be configured to send a copied status notification specifying a range [S1,E1] to a coordinator, wherein S1 may associated with a start value of the range and E1 may be associated with an end value of the range corresponding to an overlapping application write I/O.

In one embodiment, during a wait for an outstanding conflicting application write I/O on a target disk to drain, a new fully overlapping application write I/O may not be received. In a further embodiment, when a new fully overlapping application write I/O may not be received, a worker may be configured to send a suspended status notification (for example "IO_SUSPENDED" or "SUSPENDED_IO" or "SUSPENDED") to a coordinator.

In one embodiment, a coordinator may receive a suspended status notification from workers (plurality of workers) in a cluster. In a further embodiment a coordinator may be configured to copy a selected range [S,E]. In a further embodiment, a coordinator may be configured to mark a selected range [S,E] as synchronized. In yet a further embodiment, a coordinator may be configured to send a resume status notification (for example "RESUME_IO" or "IO-RESUME" or "RESUME") to workers in a cluster. In yet a further embodiment, a coordinator may wait for workers to respond, and when workers may have responded with a success status notification (for example r "IO-SUCCESS" or "SUCCESS-IO" or "SUCCESSFUL" or "SUCCESS") to a resume status notification, a coordinator may be configured to shift to a subsequent next range that may be copied.

In one embodiment, a coordinator may in response to a suspend status notification, on receiving a copied status notification from any of a plurality of workers in a cluster may be configured to mark a specifying/specified range [S1, E1] as synchronized. In a further embodiment a coordinator may be configured to send a resume status notification to workers in a cluster. In a further embodiment a coordinator may mark the specified range [S1,E1] as synchronized. In yet a further embodiment, a coordinator may send a resume status notification to workers in a cluster. In yet a further embodiment a coordinator may wait for workers to respond, and when workers respond with a success status notification to the resume status notification, coordinator may be configured to shift to a subsequent next range that may be copied.

In one embodiment, a coordinator may in response to a suspend status notification, may be configured to receive at least one of an error status notification ("FAULT" or "SLIP" or "DEFECT" or "MISTAKE" or "FAIL" OR "ERROR") or a timeout status notification ("BREAK" or "REST" or "PAUSE" or "HALT" or "TIMEOUT") from any of a plurality of workers in a cluster. In a further embodiment, a coordinator may on receipt of the at least one an error status notification or a timeout status notification, may be configured to interrupt synchronization between a source disk and a target disk with an error.

In one embodiment, a coordinator in response to a resume status notification may be configured to receive at least one of an error status notification or a timeout status notification from any of a plurality of workers in a cluster. In a further embodiment, a coordinator on receipt of the at least one an error status notification or a timeout status notification, may be configured to interrupt synchronization between a source disk and a target disk with an error.

In one embodiment, any of the plurality of workers on receiving a resume status notification from a coordinator may be configured to resume a suspended I/O. In a further embodiment, any of a plurality of workers may send a success status notification to a worker if I/Os that may have been suspended starting from a time of a suspended status notification until an I/O may be resumed. In a further embodiment, any of the plurality of workers on receiving a resume status notification from a coordinator may be configured to send an error status notification if the I/O may not have been suspended starting from a time of a suspended status notification until a resume status notification may be received.

In a further embodiment, any of a plurality of workers, on receiving a resume status notification from a coordinator, may be configured to resume a suspended I/O.

In some embodiments, the terms indicated in the discussion such as "SUSPEND", "SUSPEND_IO[S,E]", "SUSPEND" "RANGE_COPIED", "COPIED" "IO_SUSPENDED". SUSPENDED", "SUCCESSFUL", "RANGE_COPIED[S1,E1]", "ERROR", "FAULT", "TIMEOUT", "BREAK", "REST" may be treated as exemplary terms, and may be replaced by other generic terms. In some embodiments, all such terms that may have the same intended meaning as that described in the present disclosure for a status notification, may fall within the scope of the embodiments of the present disclosure.

Figure 1:
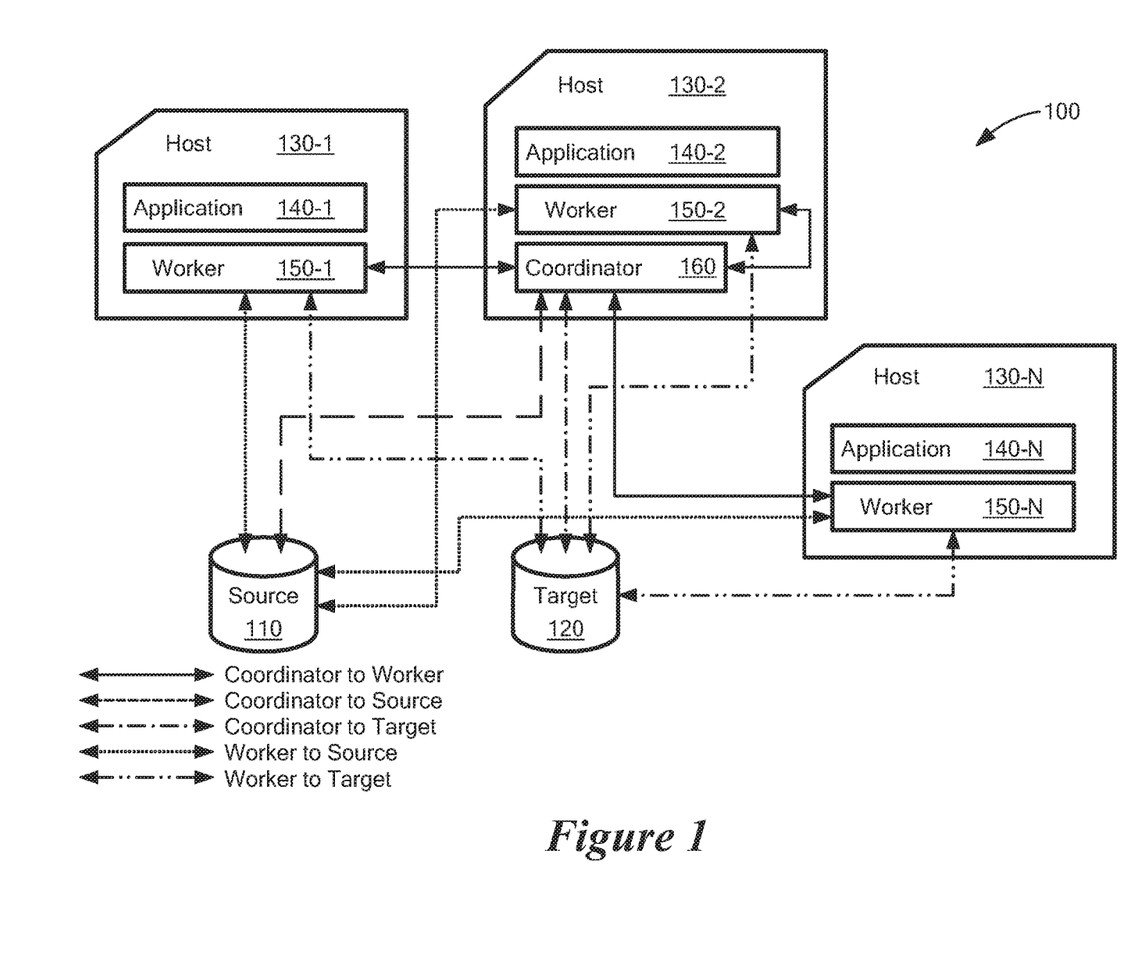
FIG. 1 is a simplified exemplary block diagram 100 of a disk migration system, according to an embodiment of the present disclosure.

Reference is now made to the example embodiment of FIG. 1, which is a simplified exemplary block diagram 100 of a disk migration system, according to an embodiment of the present disclosure. Illustrated in FIG. 1 is source disk 110 and target disk 120, wherein a copy (copy/migration of data) needs to be performed from source disk 110 to target disk 120. Source disk 110 and target disk 120 are coupled to a number of nodes (hosts) 103-1 . . . 130-N, in a cluster environment 100. Host 103-1 . . . 103-N have corresponding application 140-1 . . . 140-N, which will be executing on the hosts or may be configured to execute on a host. Applications 140-1 . . . 140-N may have data stored on source disk 110, and host 130-1 . . . 130-N may be configured to retrieve application's 140-1 . . . 140-N data from the source disk. Hosts 130-1 . . . 130-N in the cluster have workers 150-1 . . . 150-N. One host 130-2 in the cluster will have a coordinator 160. Coordinator 160 and workers 150-1 . . . 150-N work in conjunction to perform migration (migration technology) of a specified disk range identified on from source disk 110 to target disk 120.

Coordinator 160 in host 130-2 is coupled to worker 150-2 on host 130-2, coordinator 160 on host 103-2 is coupled with worker 150-1 on host 130-1, coordinator 160 on host 130-2 is coupled with worker 150-N on host 130-N, i.e., coordinator 160 on node 130-2 is coupled to workers 150-1 . . . 150-N in the cluster. Each worker 150-1 . . . 150-N in the cluster is also coupled to source disk 110 (dotted arrow line). Each worker 150-1 . . . 150-N in the cluster is coupled to target disk 120 (dashed-double dotted arrow line). Coordinator 160 on host 103-2 in the cluster is coupled with every worker 150-1 . . . 150-N in the cluster (solid arrow line) on a respective host 103-1 . . . 103-N. Coordinator 160 on host 103-2 in the cluster is coupled with source disk 110 (dashed arrow line). Coordinator 160 on host 130-2 in the cluster is also coupled with target disk 120 (dashed-dotted arrow line).

In one embodiment, cluster environment may be an active-active cluster environment. In one embodiment, a coordinator may be a process that may be configured to perform a copy (copy sweep, as discussed previously). In a further embodiment, a coordinator together with workers in a cluster may be configured to define a migration process (migration technology) for that cluster. In a further embodiment, cluster environment may be a geo-distributed cluster in which case only part of the nodes in the cluster may have access to the source disk and target disks.

In the exemplary embodiment of FIG. 1, only a single coordinator is illustrated. However, in some embodiment, in a cluster environment there may be possibility of several (multiple) coordinators that may exist on different hosts in the cluster. In one embodiment, when there may be multiple coordinators in the cluster, each of the multiple coordinator may be coupled to a source disk, a target disk and to workers in the cluster. In one embodiment, for example, if a disk may be split to several ranges and each node may be configured to copy it's own range, then there may exist several coordinators. In another embodiment, for any copy range defined, there may be one coordinator.

In a further embodiment, a worker may be a process that may be running/executing on a node. In a further embodiment, a worker in general may be configured to receive a request from a coordinator, and may respond to a request(s) from a coordinator. In one embodiment a worker and a coordinator together may define the migration process from a source disk to a target disk.

Figure 2:
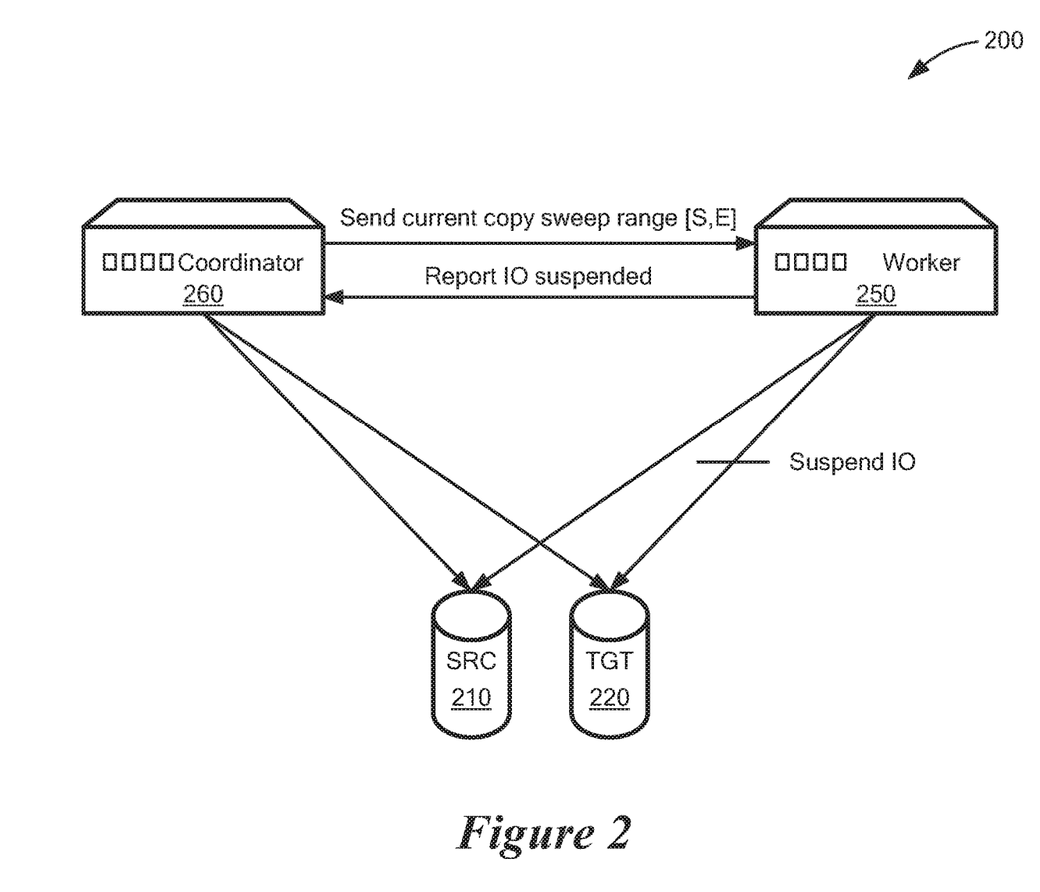
FIG. 2 is a simplified exemplary architecture block diagram 200 of a source disk and a target disk during migration, according to an embodiment of the present disclosure.

Reference is now made to the example embodiment of FIG. 2, which is a simplified exemplary architecture block diagram 200 of a source disk and a target disk during a migration process, according to an embodiment of the present disclosure. FIG. 2 illustrates a simple architecture to suspend write I/Os, and then report to coordinator 260 that write I/Os have been suspended on the specified range by worker 250. Copy of the specified range [S,E] can be performed from source disk 210 to target disk 220 once write I/Os in the cluster has been suspended on the range [S,E].

FIG. 2 illustrates a migration process wherein a copy needs to be performed from source disk 210 to target disk 220. Coordinator 260 identifies a copy range [S,E] (specified range, selected range or chosen range), where S is the start value of the range to be copied and E is the end value of the range to be copied. Coordinator 260 transmits (sends) the current copy range [S,E] to worker 250. Worker 250 is configured to receive the copy range [S,E] from coordinator 260, and worker 250 is then configured to suspend write I/Os for the copy range [S,E] on the target disk. Worker 250 is then configured to report to coordinator 260 that write I/Os on the specified range [S,E] has been suspended, and a copy can be performed between source disk 210 and target disk 220 for the selected range [S,E] (also referred to as simply as range[S,E]). An example embodiment of a generic process may be illustrated with respect to FIG. 5 and FIG. 6 as described below.

Figure 3:
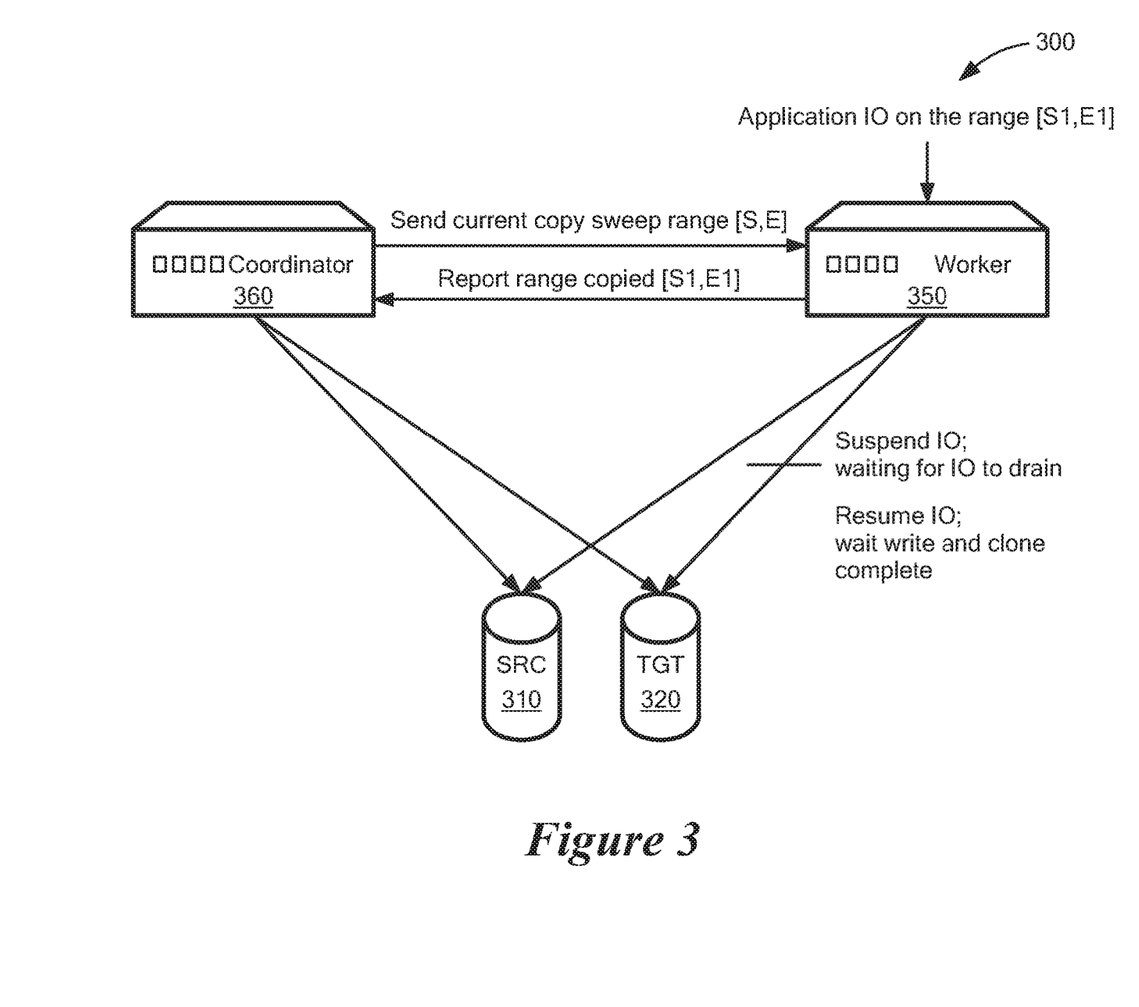
FIG. 3 is a simplified exemplary architecture block diagram 300 of a source disk and a target disk during migration, according to an embodiment of the present disclosure.

Reference is now made to the example embodiment of FIG. 3, which is a simplified exemplary architecture block diagram 300 of a source disk and a target disk during migration process, according to an embodiment of the present disclosure. FIG. 3 illustrates a simple architecture to get/obtain new application I/Os (write) during the process/time of waiting for an I/O on the target disk to drain.

As illustrated in FIG. 3 is source disk 310 and target disk 320, wherein a copy needs to be performed from source disk 310 to target disk 320. Coordinator 360 identifies a copy range [S,E] where S is the start value of the range to be copied and E is the end value of the range to be copied from source disk 310 to target disk 320. Coordinator 360 transmits (sends) the current copy range [S,E] to worker 350. Worker 350 on receiving the copy range [S,E] notification from coordinator 360 is configured to suspend write I/Os on the range [S,E] on target disk 320. Worker 250 is then configured to return a notification that the actual range of blocks is written by the application. Worker 250 returns a copied status notification (RANGE_COPIED ($S_1$, $E_1$)), for application write I/Os on range [$S_1$, $E_1$]. In case worker 320 has got fully overlapping application write I/Os for the copy range [S,E], and this condition is identified by coordinator 360, then there is no need to copy the range [S,E]. Coordinator 360 marks a returned range [$S_1$, $E_1$] as copied and moves to the subsequent next range to be copied. Coordinator 260 is then configured to send a resume status notification (RESUME_IO (S, E)) to every worker 250 (in the cluster). An example embodiment of a generic process may be illustrated with respect to FIG. 5 and FIG. 6 as described below.

As discussed previously, in one embodiment a coordinator may handle a process that may be configured to perform a copy (copy sweep, as discussed previously). In a further embodiment, it may be possible that there may exist several coordinators (for example, a case where if a disk may be split into several ranges and each node may be configured to copy it's own range). In a further embodiment, for any copy sweep range there may be only one coordinator. In a further embodiment, a worker may handle a process which runs on a node in a cluster. In a further embodiment, a worker in general may be configured to respond to a request(s) from a coordinator. In one embodiment a conflicting write may occur, in which case application write I/Os may overlap with a copy range identified by a coordinator. In a further embodiment, a host/node may not be able to detect a range associated with an application write I/O (write I/O), and such a condition may be treated as conflict. In yet a further embodiment, a fully overlapping write I/O for copy range [S,E] may occur, which may mean that one or more write I/Os with a cumulative range [S1, E1] may cover copy range [S,E] (S>=S1, E<=E1) completely.

Figure 4:
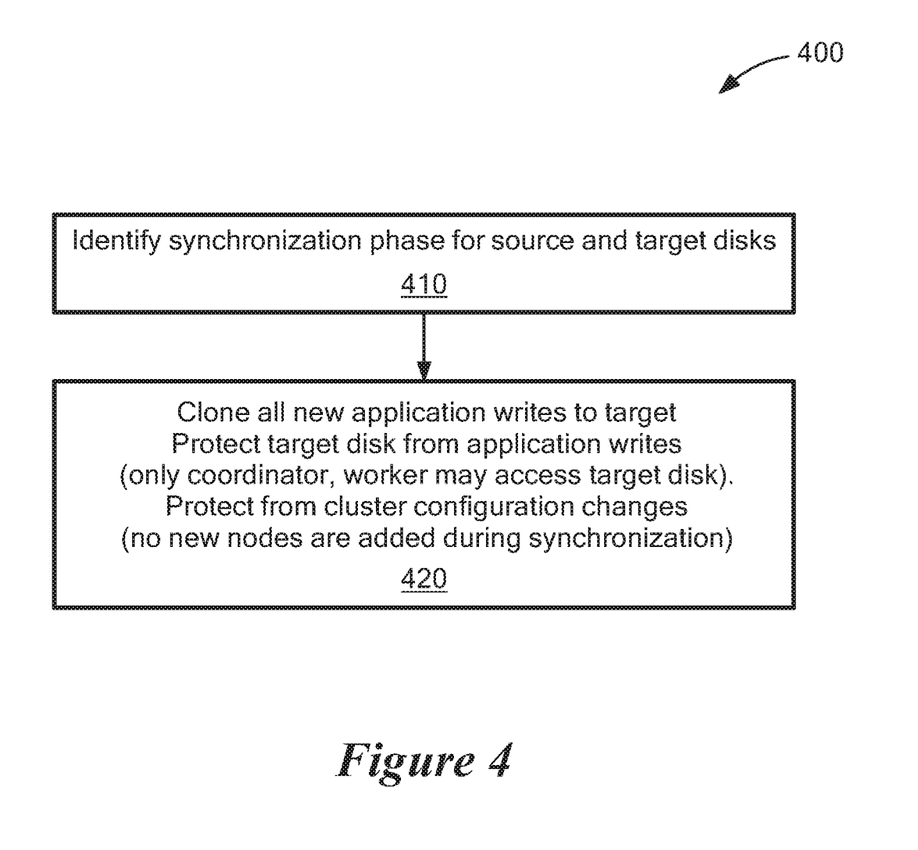
FIG. 4 is a simplified exemplary flow chart 400 for synchronizing a source disk to a target disk, according to an embodiment of the present disclosure.

Reference is now made to the example embodiment of FIG. 4, which is a simplified exemplary flow chart 400 for synchronizing a source disk to a target disk, according to an embodiment of the present disclosure. A request for synchronization is identified or determined, wherein the request is associated with a synchronization phase for a source disk and a target disk (Step 410). After identifying the synchronization request, new applications write I/Os are cloned from the source disk to the target disk (Step 420).

In one embodiment, it is up to a migration technology/migration process to define the order in which I/Os may be issued to source disk and clone request may be issued to a target disk. In one embodiment a clone request may be issued later than original request. In a further embodiment a clone request may be issued before original request. In yet a further embodiment a clone request and original request may be issued simultaneously. In a further embodiment, after identifying a synchronization request, target disk may be protected from application write I/Os. In a further embodiment, only a migrator may access a target disk. In a further embodiment a migrator may be a coordinator and a specified worker that may be involved in the migration process. In a further embodiment, after identifying the synchronization request, cluster configuration may not be changed during a migration. In yet a further embodiment, new nodes may not be added during migration. In yet a further embodiment, there may be a possibility to remove nodes in a cluster if a migration process may support such a removal of nodes in a cluster.

In one embodiment the cloning/copying from a source disk to a target disk may include a coordinator and a worker in the cluster. In one embodiment a coordinator may be configured to define a copy range that may be copied from a source disk to a target disk. In a further embodiment, a coordinator along with workers in a cluster may be configured to suspend application write I/Os for a specified range (copy range) on a target disk. In a further embodiment, after workers suspend application write I/Os on a target disk, a coordinator may then be configured to copy/clone the copy range from a source disk to a target disk. An example embodiment of a generic process may be illustrated with respect to FIG. 5 and FIG. 6 as described below.

Figure 5:
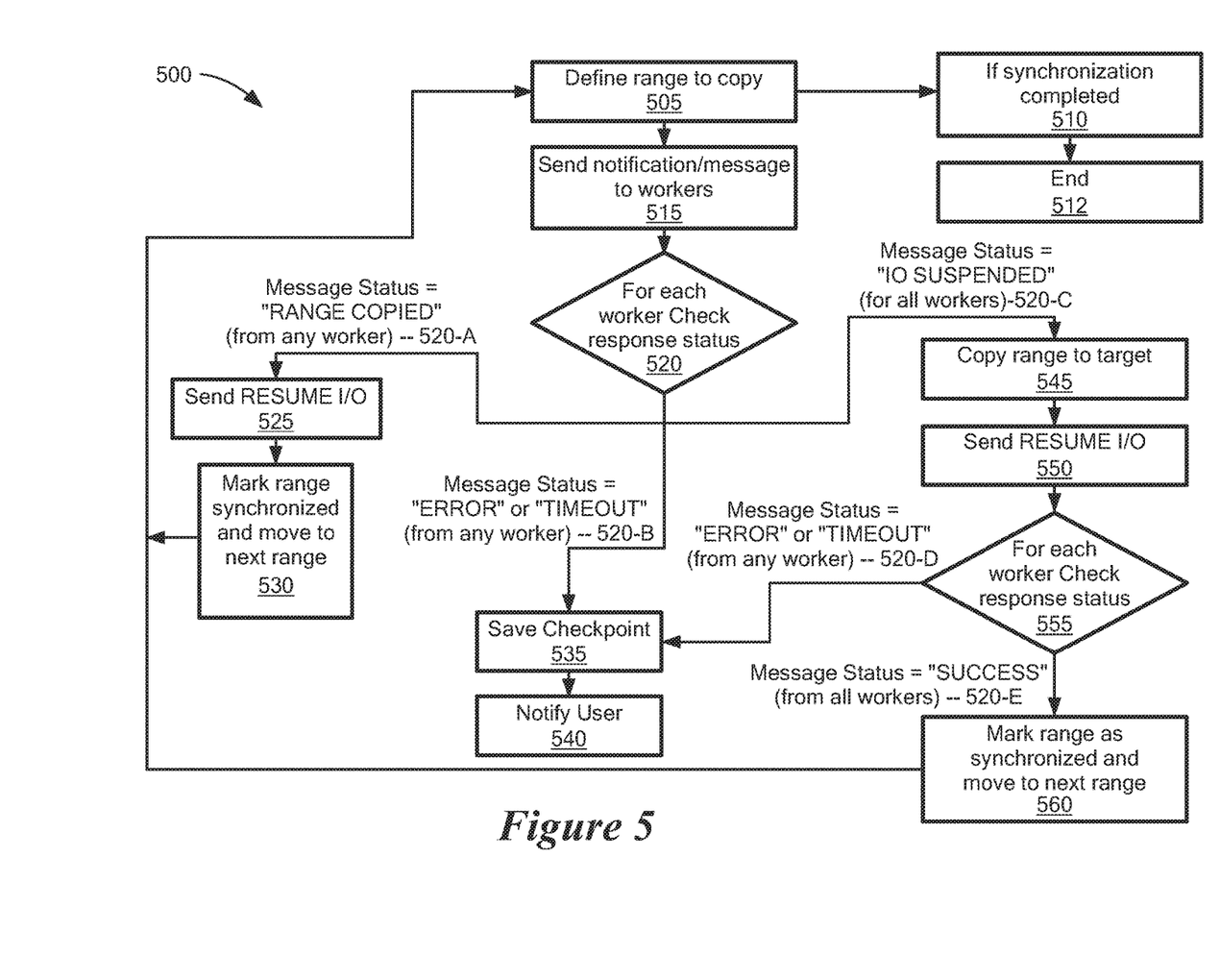
FIG. 5 is a simplified exemplary flow chart 500 of an a process to synchronize a source disk to a target disk performed by a coordinator, according to an embodiment of the present disclosure.

Reference is now made to Figure the example embodiment of 5, which is a simplified exemplary flow chart 500 of a process to synchronize a source disk to a target disk performed by a coordinator, according to an embodiment of the present disclosure. A range [S,E] (also referred to as copy sweep range, selected range, specified range, identified range) to be copied is first defined (Step 505), where S is associated with a start value and E is associated with the end value of the range to be copied. When synchronization between the source disk and the target disk is completed (Step 510), the process of synchronization ends (Step 512).

Once the range [S,E] is defined, coordinator is configured send a notification/message to workers in the cluster that coordinator is attempting to copy the selected range [S,E], wherein the notification is a suspend notification or suspend status notification (SUSPEND_IO (S, E) for simplicity) (Step 515).

After sending the suspend status notification to the workers in the cluster (Step 515), a check is performed for each of the workers in the cluster (Step 520), during which time the coordinator is configured to await a response from the workers. The response returned by the workers could be one of the following four (4) states (Step 520):
  i. a copied status notification ("RANGE_COPIED (S1, E1)"),
  ii. a suspended status notification ("IO_SUSPENDED"),
  iii. a error status notification ("ERROR"), and
  iv. a timeout status notification ("TIMEOUT") (Step 520).

Case 1—If the worker has return copied status notification ("RANGE_COPIED ($S_1$, $E_1$)"), which can be received from at least one of the worker in the cluster (Step 520-A), it means that the worker received a fully overlapping application I/O (write) for the selected range [S,E], and therefore there is no need to copy the selected range. The worker returns an actual range of blocks written by application I/O write, and if any worker returns RANGE_COPIED ($S_1$, $E_1$), the coordinator mark returned range [S1, E1] as copied/synchronized and then moves to the subsequent next range (Step 530). At the time of marking the range as synchronized/copied, the coordinator sends a resume status notification ("RESUME_IO (S, E)") to worker in the cluster (Step 525). Control is then transferred to Step 505.

Case 2—A worker may return an error status notification (ERROR) or a timeout status notification (TIMEOUT) (Step 520-B.) When an ERROR or a TIMEOUT occurs, coordinator is configured to save the current checkpoint, i.e., save the last successful copy range (Step 535). Once the coordinator has saved the current checkpoint, coordinator then notify a user by returning an error message to user (Step 540). User may then restart synchronization after the problem is fixed.

Case 3—If the worker return the suspended status notification ("IO_SUSPENDED") (Step 520-C), this means that worker in the cluster have successfully suspended application write I/Os for the copy range[S,E], and nodes in the cluster must have returned a suspended status notification ("IO_SUSPENDED") (Step 520-C). Once "IO_SUSPENDED" status is identified (Step 520-C), coordinator is configured to copy data, i.e., copy the selected range [S,E] from a source disk to a target disk, wherein coordinator is configured to read from source disk and write to target disk (Step 545). Coordinator is configured to resume I/Os on the selected range [S,E] by sending the resume status notification ("RESUME_IO"), wherein workers are configured to acknowledge that application write I/Os on selected range [S,E] may have been resumed (Step 550). A check is performed to monitor the status of response for each worker (Step 555). If an ERROR or TIMEOUT notification is received by coordinator, then coordinator is configured to save the checkpoint, i.e., save the last successful copy range (Step 535). Once the checkpoint is save, coordinator is configured to notify a user by returning an error message to user (Step 540). If a success status notification ("SUCCESS") is received by coordinator, then coordinator may mark the selected range [S,E] as copied/synchronized and may then move to the next/subsequent range to be copied (Step 560). Control is then transferred to Step 505.

In one embodiment, a copy range [S,E] may be defined by a coordinator, where S may be associated with the starting value of the range to be copied and E may be associated with the end value of the range to be copied.

In one embodiment, an ERROR may mean that a worker may not able to suspend application I/Os (writes) on the selected range [S,E]. In another embodiment, a TIMEOUT may mean that some worker may not respond in the defined period of time or the workers's response may have been lost somewhere in the communication channel in a cluster.

Figure 6:
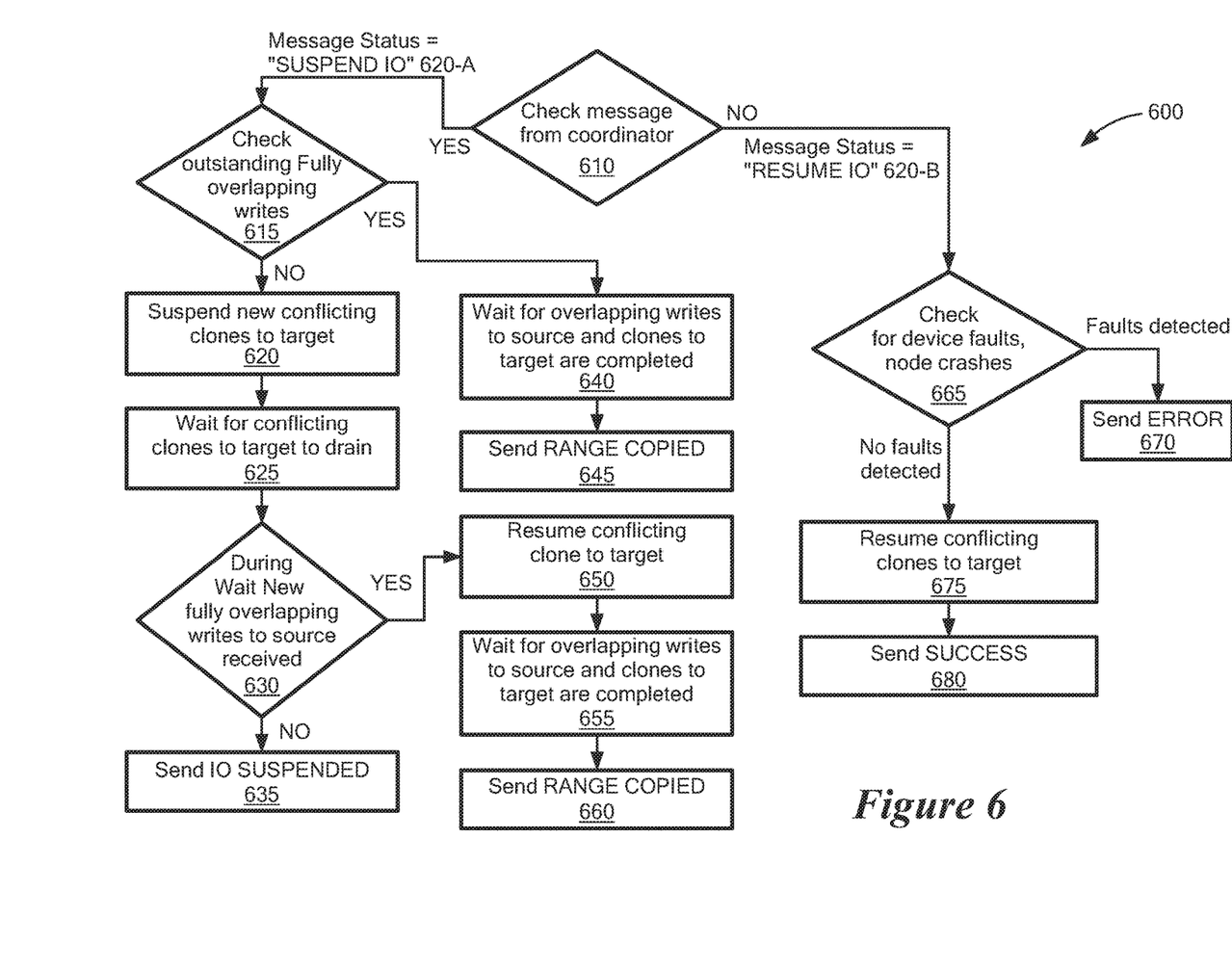
FIG. 6 is a simplified exemplary flow chart 600 of an a process to synchronize a source disk to a target disk performed by a worker, according to an embodiment of the present disclosure

Reference is now made to the example embodiment of FIG. 6, which is a simplified exemplary flow chart 600 of a process to synchronize a source disk to a target disk performed by a worker, according to an embodiment of the present disclosure. The worker is configured to check a message/notification received from the coordinator, and the message received could be one of the following two states (Step 610):

i. a suspend status notification ("SUSPEND_IO") (620-A) and ii. a copied status notification ("RESUME_IO") (Step 620-B).

If the worker receives a SUSPEND_IO (S, E) notification (suspend status notificatin) that coordinator is going to copy a selected range, a check is performed to determine fully overlapping write I/Os for the range [S,E] (Step 615). If worker is able to determine immediately that there are outstanding conflicting writes that cover the whole range (selected range), then worker waits for overlapping write I/Os to the source disk and clones overlapping application write I/Os on the target disk (Step 640), after which the worker responds that the range [S1, E1] was copied by sending with a copied status notification (RANGE_COPIED ($S_1$, $E_1$)) to the coordinator (Step 645).

If there are no outstanding conflicting write I/Os that cover the whole range or if the worker is not able to determine any outstanding conflicting writes I/Os (Step 615), then worker is configured to suspends new conflicting clones to the target disk (Step 620). Workers waits for outstanding conflicting clones on target disk to drain (Step 625), i.e., worker waits for outstanding conflicting clones to complete and suspends new conflicting clones on target disk.

During wait, a check is made to ascertain whether any new fully overlapping write I/Os to the source are being received (Step 630). If conflicting write I/Os complete and new application write I/Os that cover the whole copy range are not received, then worker responds to the coordinator with a suspended status notification ("IO_SUSPENDED"), which means that copy of the selected range can proceed on the coordinator's side (Step 635).

If on the other hand, worker gets new fully overlapping application write I/Os for the selected range [S,E], before this is accomplished the worker is configured to abandon its wait and resumes suspended IO (Step 650). Worker is then configured to wait for write and clone for overlapping application write I/Os to the target disk to be complete (Step 655). Worker then responds to the coordinator with a copied status notification (RANGE_COPIED ($S_1$, $E_1$)), where [S1, E1] is the actual range of the application fully overlapping write I/O (Step 660), In one embodiment, the synchronization algorithm proposed may solve the issue of synchronizing two disks (source and target) with application I/Os running on source in an active-active cluster environment. Embodiments of the present disclosure may be advantageously used for copy sweep for hot spots on the disk which are constantly being changed by some node. Embodiment of the present disclosure may be advantageously used to minimize effects of I/O suspension on the application by minimizing the cases in which nodes need to suspend I/O for a long time.

Figure 7:
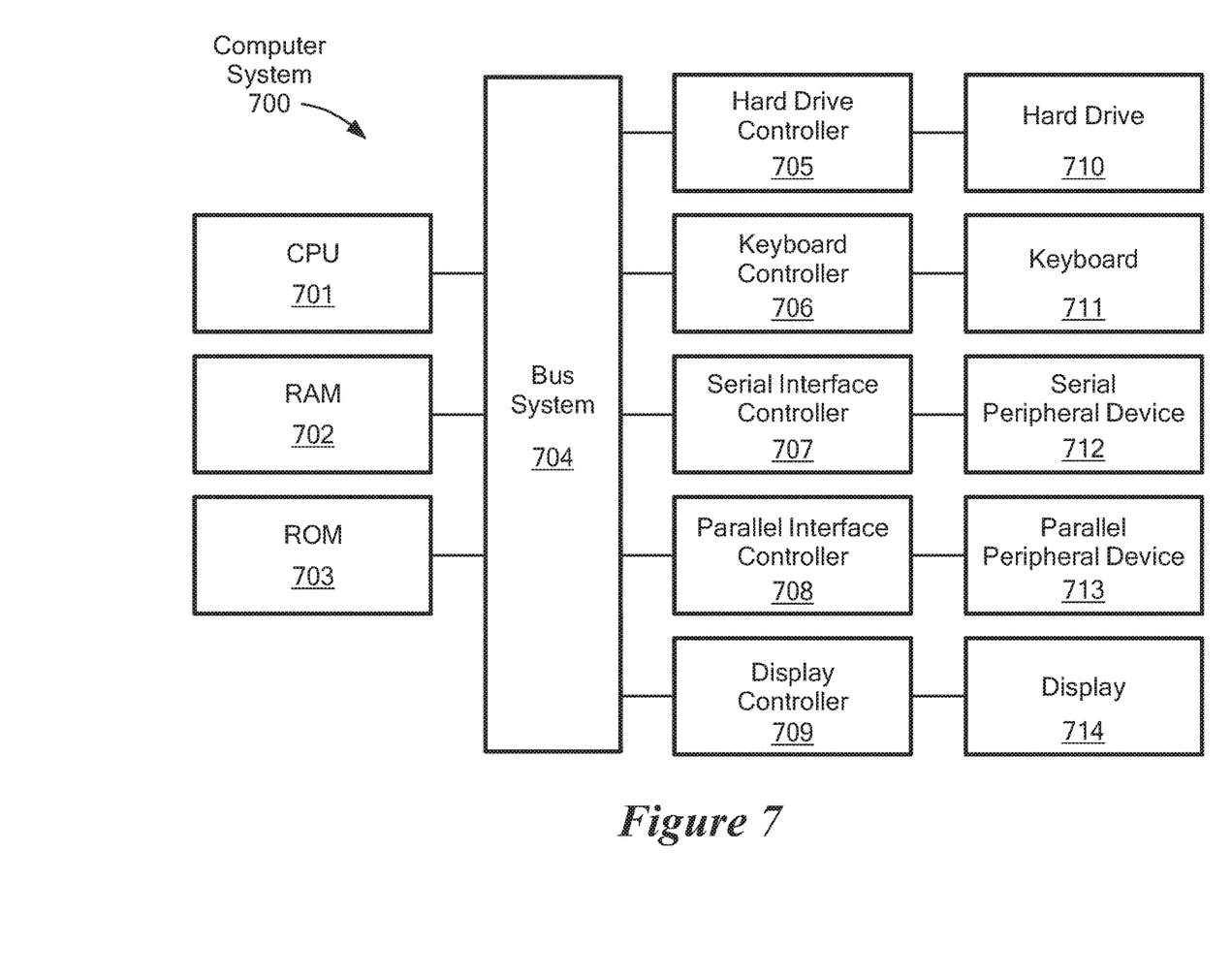
FIG. 7 is an example of an embodiment of an apparatus that may utilize the techniques described herein, in accordance with an embodiment of the present disclosure.

Reference is now made to the example embodiment of FIG. 7, which illustrates is an example of an embodiment of an apparatus/system 700 that may utilize the techniques described herein, in accordance with an embodiment of the present disclosure. As illustrated in FIG. 7, the computer system 700 includes: CPU (Central Process Unit) 701, RAM (Random Access Memory) 702, ROM (Read Only Memory) 703, System Bus 704, Hard Drive Controller 705, Keyboard Controller 706, Serial Interface Controller 707, Parallel Interface Controller 708, Display Controller 709, Hard Drive 150, Keyboard 711, Serial Peripheral Equipment 712, Parallel Peripheral Equipment 713 and Display 714. Among above devices, CPU 701, RAM 702, ROM 703, Hard Drive Controller 705, Keyboard Controller 706, Serial Interface Controller 707, Parallel Interface Controller 708 and Display Controller 709 are coupled to the System Bus 704. Hard Drive 750 is coupled to Hard Drive Controller 705. Keyboard 711 is coupled to Keyboard Controller 706. Serial Peripheral Equipment 712 is coupled to Serial Interface Controller 707. Parallel Peripheral Equipment 713 is coupled to Parallel Interface Controller 708. And, Display 714 is coupled to Display Controller 709.

The exemplary computer system 700 is discussed only for illustrative purpose and should not be construed as a limitation on the embodiments or scope of the present disclosure. In some cases, some devices may be added to or removed from a computer system based on specific situations. For example, a computer system may be representative of a standalone system or a system of a production site, which comprises a number of hosts coupled to a source disk and a target disk. In most embodiments, a system/device may comprise a processor and a memory, such as a laptop computer, personal digital assistant, or mobile phones.

The methods and apparatus of this disclosure may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the disclosure. When implemented on one or more general-purpose processors, the program code combines with such a processor to provide a unique apparatus that operates analogously to specific logic circuits. As such a general purpose digital machine can be transformed into a special purpose digital machine. In certain embodiments, a processor may be a physical processor, in other embodiments a processor may be a virtual processor.

Figure 8:
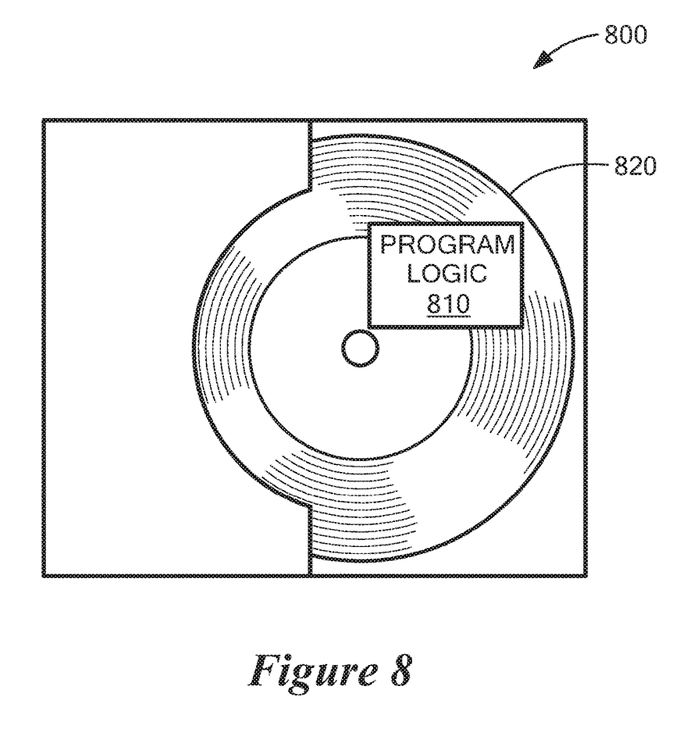
FIG. 8 is an example of an embodiment of a method embodied on a computer readable storage medium that may utilize the techniques described herein, in accordance with an embodiment of the present disclosure.

Reference is now made to an example embodiment of FIG. 8, which is an example of an embodiment of a method embodied on a computer readable storage medium that may utilize the techniques described herein, in accordance with an embodiment of the present disclosure. FIG. 8 is an example of an embodiment of a method embodied on a computer readable storage medium that may utilize the techniques described herein, in accordance with an embodiment of the present disclosure. FIG. 6 shows Program Logic 810 embodied on a computer-readable medium 830 as shown, and wherein the Logic is encoded in computer-executable code configured for carrying out the reservation service process of this disclosure and thereby forming a Computer Program Product 800. Logic 740 of FIG. 7 may be loaded into memory 704 and executed by processor 730. Logic 740 may also be the same logic 810 on computer readable medium 830.

The logic for carrying out the method may be embodied as part of the aforementioned system, which is useful for carrying out a method described with reference to embodiments shown in, for example, FIGS. 1 to 6. For purposes of illustrating the present disclosure, the disclosure is described as embodied in a specific configuration and using special logical arrangements, but one skilled in the art may appreciate that the device is not limited to the specific configuration but rather only by the claims included with this specification.

The method described herein (FIG. 5 and FIG. 6) are not limited to use with the hardware and software of FIG. 7; they may find applicability in any computing or processing environment and with any type of machine or set of machines that is capable of running a computer program. The method described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette.

The methods described herein are not limited to the specific examples described. Rather, any of the method steps in FIGS. 5 and 6 may be re-ordered, combined or removed, performed in parallel or in serial, as necessary, to achieve the results set forth above.

In one embodiment, a system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. In certain embodiments, a processor may be a physical processor or a virtual processor or a mapping of physical and or virtual processors.

Elements of different embodiments described herein may be combined to form other embodiments not specifically set forth above. Other embodiments not specifically described herein are also within the scope of the following claims.

What is claimed is:

1. A method for synchronizing data between a source disk and a target disk in a cluster, the method comprising:
   performing synchronization between a source disk and a target disk, the synchronization being performed while a plurality of application I/Os on a plurality of nodes in a cluster are enabled to access the source disk; and wherein a coordinator and a plurality of workers in the cluster are configured to manage copying data from the source disk to the target disk,
   wherein the coordinator defines a selected range [S,E] to be copied from a source disk to a target disk, wherein S is associated with a start value and E is associated with an end value of the range to be copied,
   wherein the coordinator send a suspend status notification comprising the selected range [S,E] to be copied to the plurality of workers in the cluster,
   wherein the worker on receiving the suspend status notification from the coordinator is configured to determine if an (any) outstanding fully overlapping application write I/Os exists, and wherein the worker is configured to check for the presence of the outstanding fully overlapping application write I/Os, and on positive determination of the outstanding fully overlapping application write I/Os, the worker further configured to:
wait until the overlapping application write I/Os is completed;
clone (copy) application write I/Os to the target disk; and
send a copied status notification comprising a specified range [S1, E1], wherein S1 is associated with a start value and E1 is associated with an end value of the range corresponding to the overlapping application write I/Os.

2. The method of claim 1, further comprises managing synchronization of a subsequent unsynchronized portion of the source disk and target disk.

3. The method of claim 1, wherein the worker is further configured to check for an outstanding overlapping write I/Os and on negative determination, the worker is configured to
suspend conflicting application write I/O clones to the target disk;
wait for the conflicting outstanding application write I/O clones on target disk to drain.

4. The method of claim 3, wherein during the wait for the outstanding conflicting application write I/O on the target disk to drain, if a new fully overlapping application write I/O is received, the worker further configured to resume the application write I/O clones to the target disk;
issue the application write I/O to the source disk;
clone (copy) the application write I/O to the target disk; and
send a copied status notification of the specified range [S1,E1] to the coordinator, wherein S1 is associated with a start value and E1 is associated with an end value of the range corresponding to the overlapping application write I/O.

5. The method of claim 3, wherein during the wait for the outstanding conflicting application write I/O to drain, if a new fully overlapping application write I/O is not received, the worker being further configured to
send a suspended status notification to the coordinator.

6. The method of claim 5, wherein the coordinator on receiving the suspended status notification from all the workers in the cluster is configured to
copy the selected range [S,E];
mark the selected range [S,E] as synchronized;
send a resume status notification to all the workers in the cluster; and
wait for all the workers to respond, and when all the workers respond with a success status notification in response to the resume status notification, shift to a subsequent next range to be copied.

7. A method for synchronizing data between a source disk and a target disk in a cluster, the method comprising:
performing synchronization between a source disk and a target disk, the synchronization being performed while a plurality of application I/Os on a plurality of nodes in a cluster are enabled to access the source disk; and
wherein a coordinator and a plurality of workers in the cluster are configured to manage copying data from the source disk to the target disk,
wherein the coordinator defines a selected range [S,E] to be copied from a source disk to a target disk, wherein S is associated with a start value and E is associated with an end value of the range to be copied,
wherein the coordinator send a suspend status notification comprising the selected range [S,E] to be copied to the plurality of workers in the cluster,
wherein the coordinator in response to suspend status notification, on receiving the copied status notification from any of the plurality of workers in the cluster is configured to
mark specified range [S1,E1] as synchronized;
send the resume status notification to the plurality of workers in the cluster; and
wait for all workers to respond, and when all the workers respond with a success status notification in response to the resume status notification, shift to a subsequent next range to be copied.

8. The method of claim 1, wherein the coordinator in response to suspend status notification, is configured to receive an error status notification from any of the plurality of workers in the cluster, and to interrupt synchronization between the source disk and the target disk with an error.

9. The method of claim 1, wherein the coordinator in response to suspend status notification, is configured to receive a timeout status notification from any of the plurality of workers in the cluster, and to interrupt synchronization between the source disk and the target disk with an error.

10. The method of claim 1, wherein the coordinator in response to resume status notification is configured to receive the error status notification, and to interrupt synchronization between the source disk and the target disk with an error.

11. The method of claim 1, wherein the coordinator in response to resume status notification is configured to receive the timeout status notification from any of the plurality of workers in the cluster, and to interrupt synchronization between the source disk and the target disk with an error.

12. The method of claim 5, wherein any of the plurality of workers on receiving the resume status notification from the coordinator is configured to resume a suspended I/O and send the success status notification to all the workers if all the I/Os were suspended starting from the time of the suspended status notification until the I/O is resumed.

13. The method of claim 5, wherein any of the plurality of workers on receiving the resume status notification from the coordinator is configured to send error status notification if all the I/O were not suspended starting from the time of the suspended status notification till resume status notification.

14. An apparatus, comprising:
electronic hardware circuitry configured to:
perform synchronization between a source disk and a target disk, the synchronization being performed while a plurality of application I/Os on a plurality of nodes in a cluster are enabled to access the source disk,
wherein a coordinator and a plurality of workers in the cluster are configured to manage copying data from the source disk to the target disk,
wherein the coordinator defines a selected range [S,E] to be copied from a source disk to a target disk, wherein S is associated with a start value and E is associated with an end value of the range to be copied,
wherein the coordinator send a suspend status notification comprising the selected range [S,E] to be copied to the plurality of workers in the cluster,
wherein the worker on receiving the suspend status notification from the coordinator is configured to determine if an (any) outstanding fully overlapping application write I/Os exists, and wherein the worker is configured to check for the presence of the outstanding fully overlapping application write I/Os, and on positive determination of the outstanding fully overlapping application write I/Os, the worker further configured to:
wait until the overlapping application write I/Os is completed;
clone (copy) application write I/Os to the target disk; and
send a copied status notification comprising a specified range [S1,E1], wherein S1 is associated with a start value and E1 is associated with an end value of the range corresponding to the overlapping application write I/Os,
wherein the circuitry comprises at least one of a processor, a memory, a programmable logic device or a logic gate.

15. The apparatus of claim 14, further comprising circuitry configured to manage synchronization of a subsequent unsynchronized portion of the source disk and target disk.

* * * * *